Feb. 1, 1966 E. L. COPONY ETAL 3,232,483
PRESET DISPENSING CONTROL
Filed Nov. 12, 1963 9 Sheets-Sheet 8

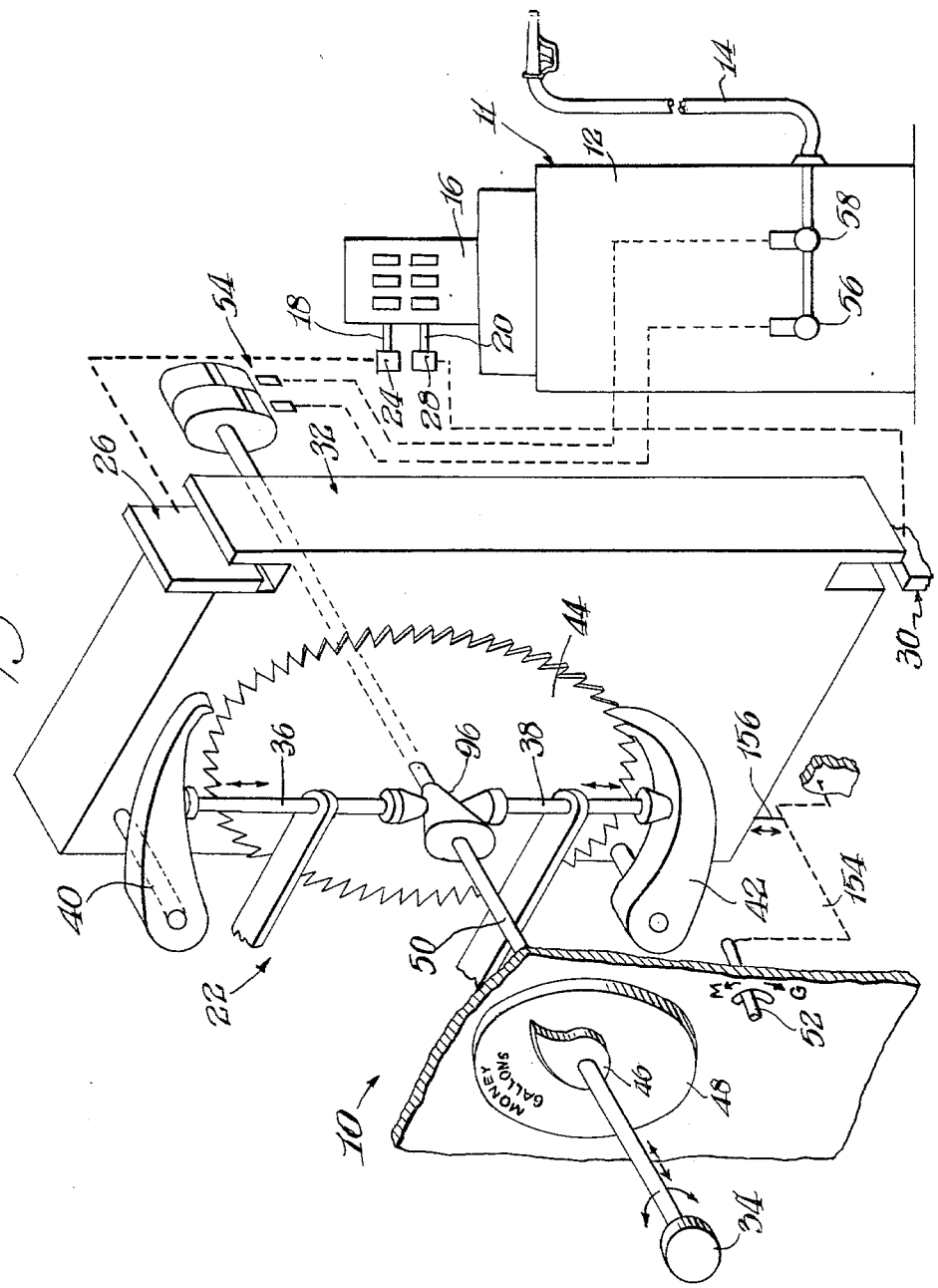

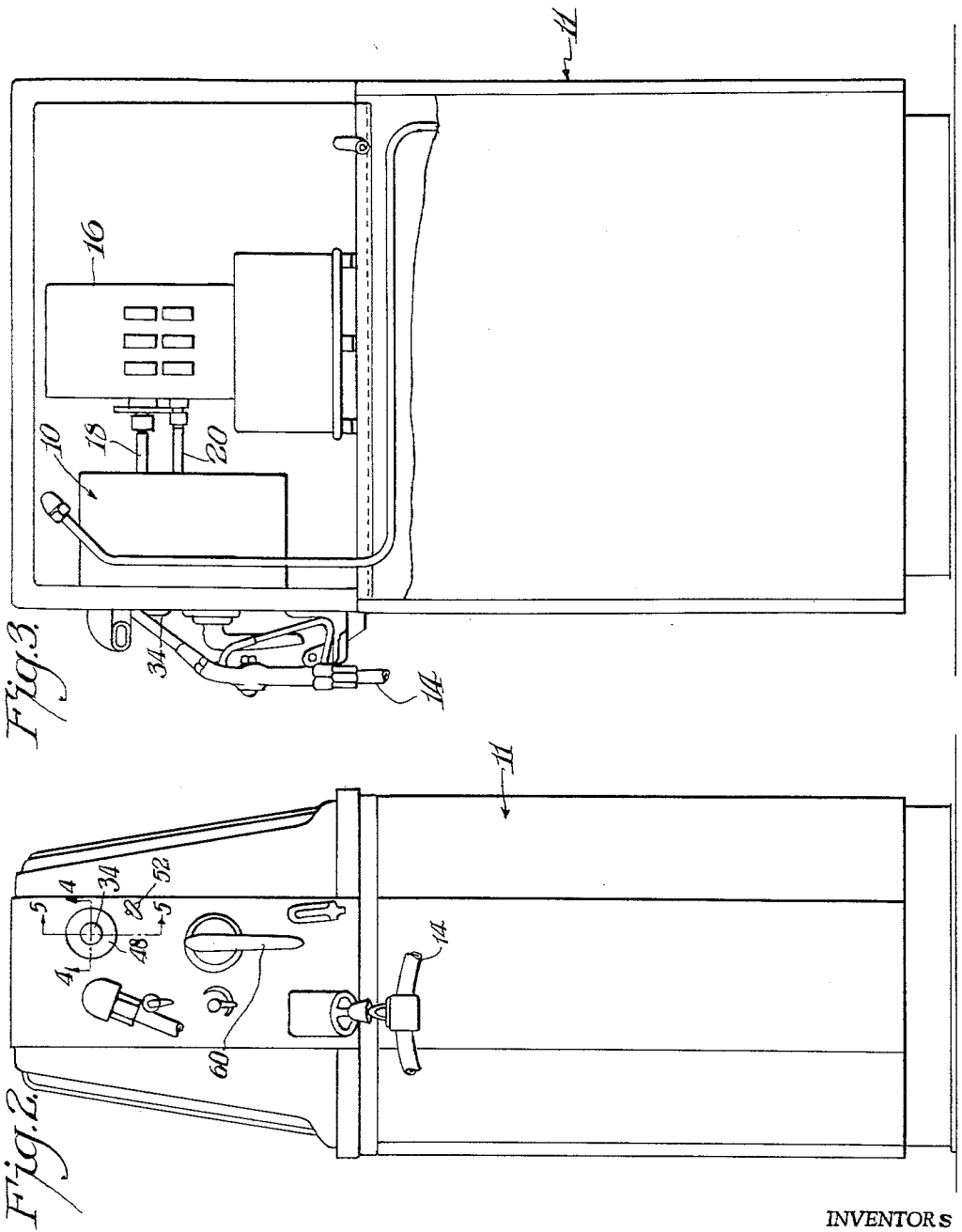

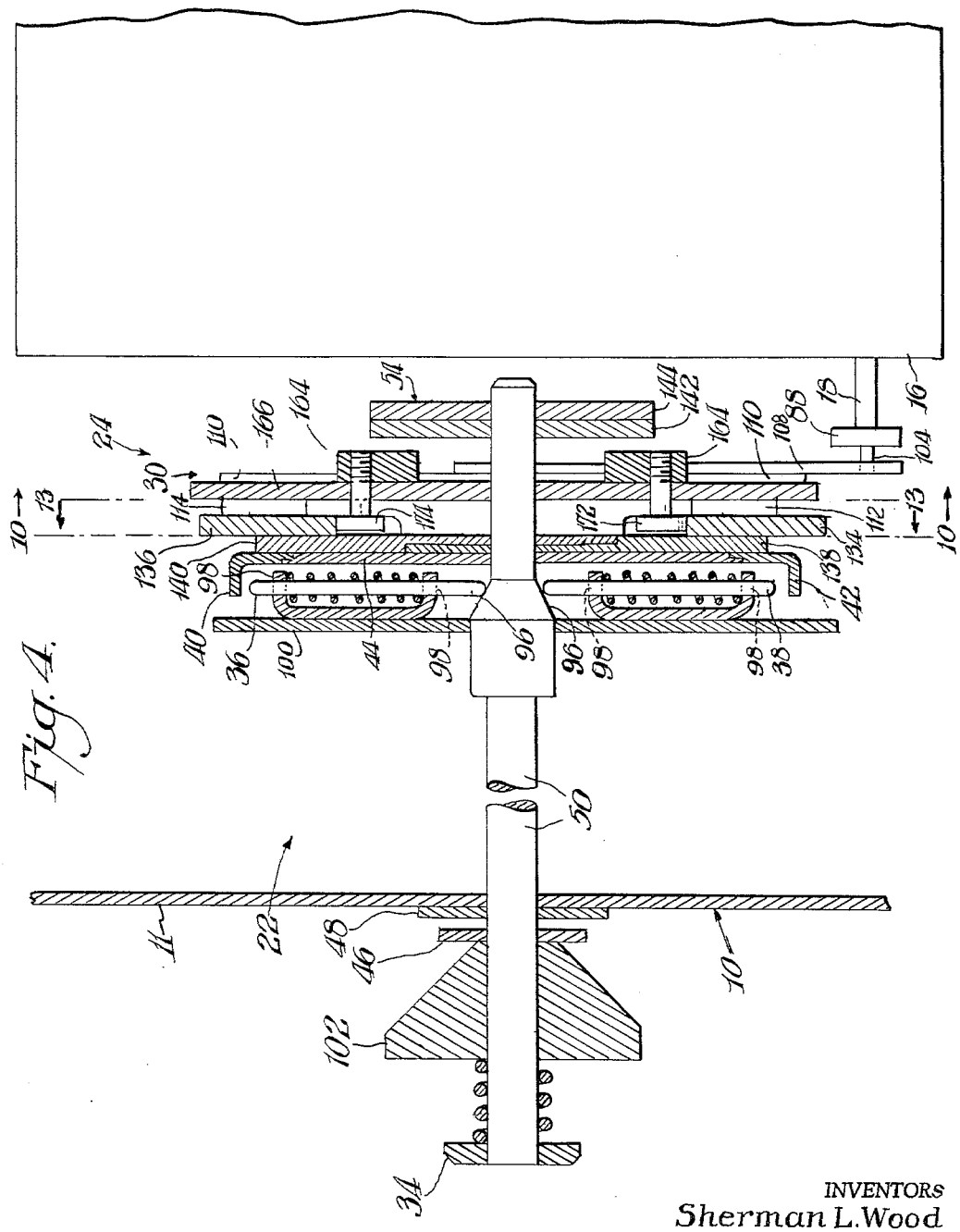

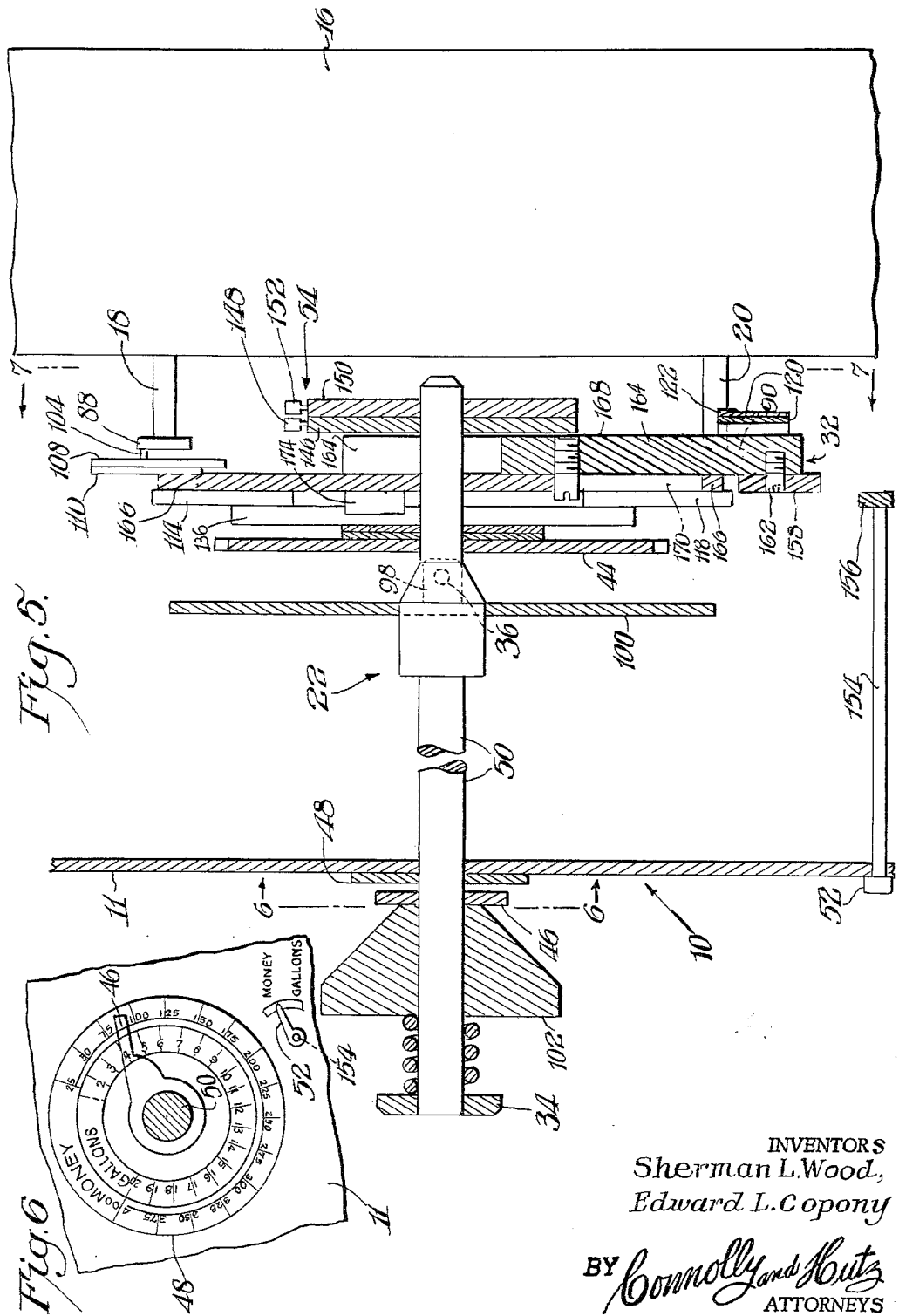

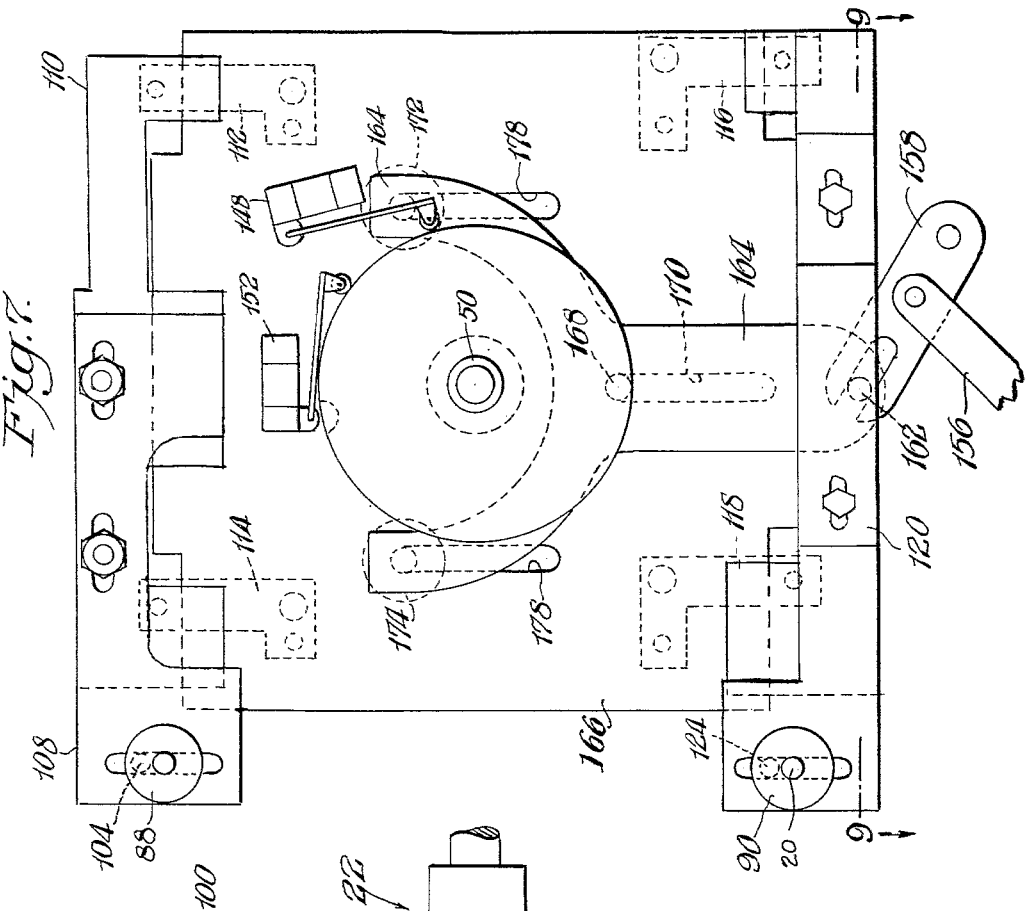

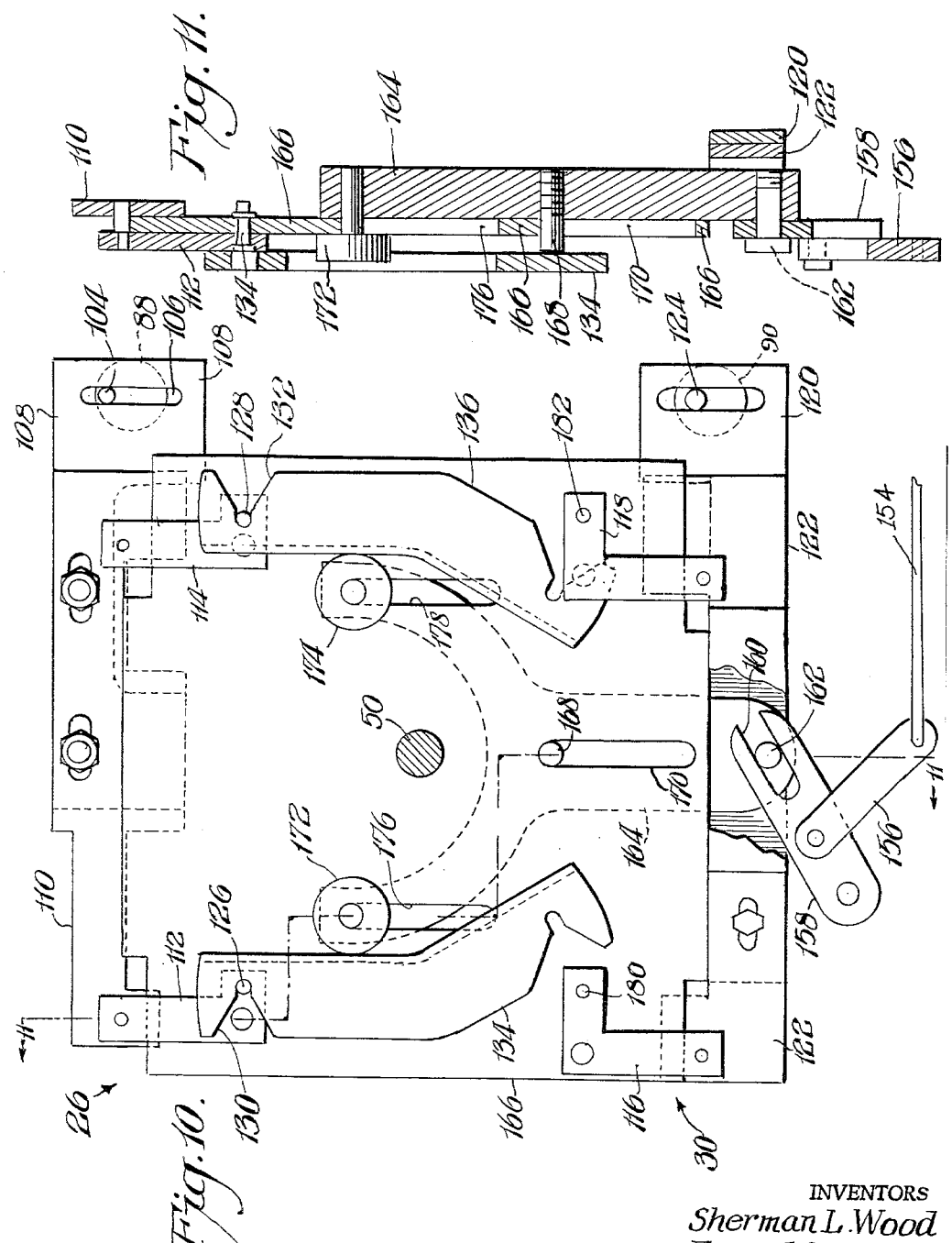

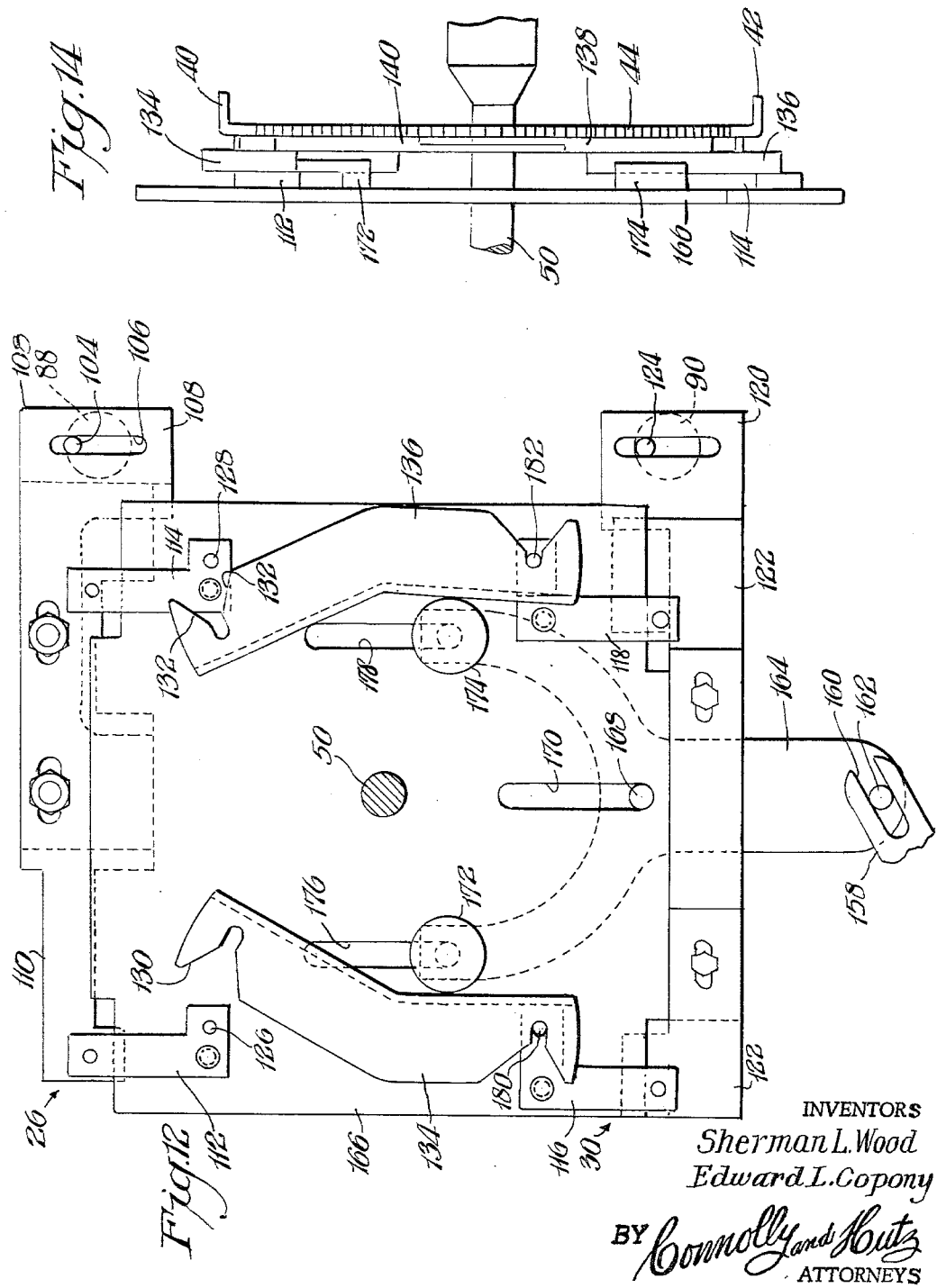

INVENTORS
Sherman L. Wood
Edward L. Copony
BY Connolly and Hutz
ATTORNEYS

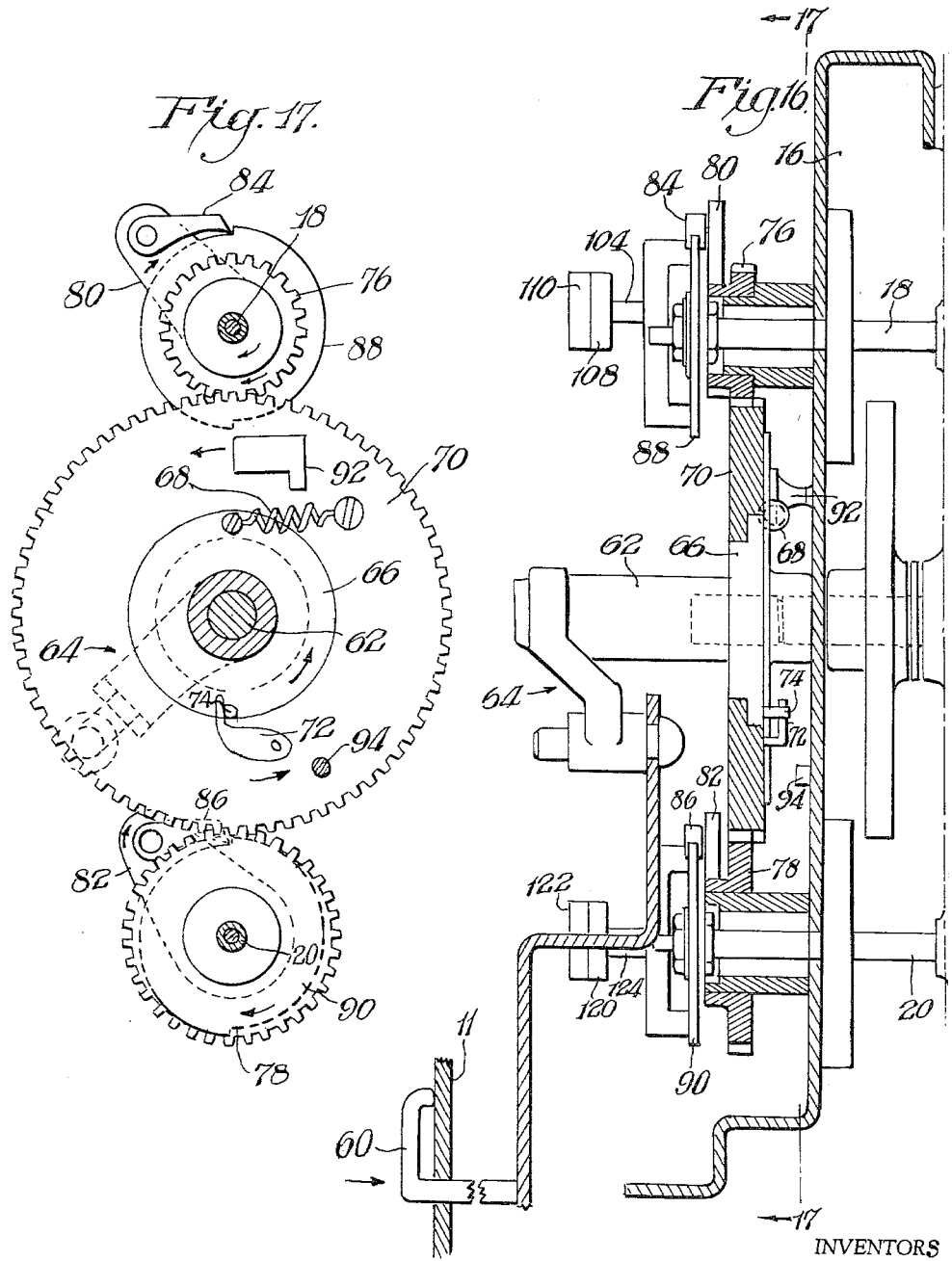

United States Patent Office 3,232,483
Patented Feb. 1, 1966

3,232,483
PRESET DISPENSING CONTROL
Edward L. Copony and Sherman L. Wood, Salisbury, Md., assignors to Symington Wayne Corporation, Salisbury, Md., a corporation of Maryland
Filed Nov. 12, 1963, Ser. No. 322,666
10 Claims. (Cl. 222—16)

This invention relates to preset dispensing control for a fluid dispenser and more particularly to such a control for a gasoline dispenser.

Preset dispensing controls permit a gasoline station attendant to operate many more dispensers than he can manually operate. Most of such existing preset controls are fairly complicated and expensive and can be set only to either money or gallon amounts.

An object of this invention is to provide a simple, inexpensive and efficient preset dispensing control.

Another object of this invention is to provide such a control which operates as a function of either cost or quantity.

In accordance with this invention a dual alternative input counter is driven by either the money or gallon shaft of a conventional fluid dispensing computer. The counter is indexed in terms of both cost and quantity. When the customer specifies the amount he wants, the attendant manually turns the counter ahead that specified amount and engages it with either the money or gallon shaft of the computer in accordance with which quantity is pre-selected. As gasoline is dispensed, the counter is driven back to its zero condition from the amount of either money or gallons to which it was present. Detecting elements connected with the counter terminate delivery after the counter is driven back to zero.

The counter may advantageously incorporate a ratchet and pawls alternatively connected to the money or to the gallon shaft of the computer. While the ratchet is turned ahead to preset the amount of money or gallons to be dispensed, the pawls are disconnected from it. A transmission shifts the pawls and ratchet alternatively into connection with the money shaft and the gallon shaft of the computer to drive the counter back to its zero condition in accordance with either the quantity of money or gallons that are preselected.

Novel features and advantages of the present invention will become apparent to one skilled in the art from a reading of the following description in conjunction with the accompanying drawings wherein similar reference characters refer to similar parts and in which:

FIG. 1 is a schematic diagram of one embodiment of this invention connected to a fluid dispenser;

FIG. 2 is a side view in elevation of a dispenser incorporating the subject matter shown in FIG. 1;

FIG. 3 is a front view in elevation of the dispenser shown in FIG. 2;

FIG. 4 is a cross-sectional plan view taken through FIG. 2 along the line 4—4;

FIG. 5 is a cross-sectional view in elevation taken through FIG. 2 along the line 5—5;

FIG. 6 is a cross-sectional view taken through FIG. 5 along the line 6—6;

FIG. 7 is a cross-sectional view in elevation taken through FIG. 5 along the line 7—7;

FIG. 8 is a side elevational view of the elements shown in FIG. 7;

FIG. 9 is a cross-sectional view taken through FIG. 7 along the line 9—9;

FIG. 10 is a cross-sectional view taken through FIG. 4 along the line 10—10;

FIG. 11 is a cross-sectional view taken through FIG. 10 along the line 11—11;

FIG. 12 is a view similar to FIG. 10 in another phase of operation;

FIG. 14 is a side elevational view of the elements shown in FIG. 13;

FIG. 16 is a schematic side view in elevation of a computer reset mechanism connected to the embodiment shown in FIGS. 2–3; and FIG. 17 is a cross-sectional view taken through FIG. 16 along the line 17—17.

Figure 15:
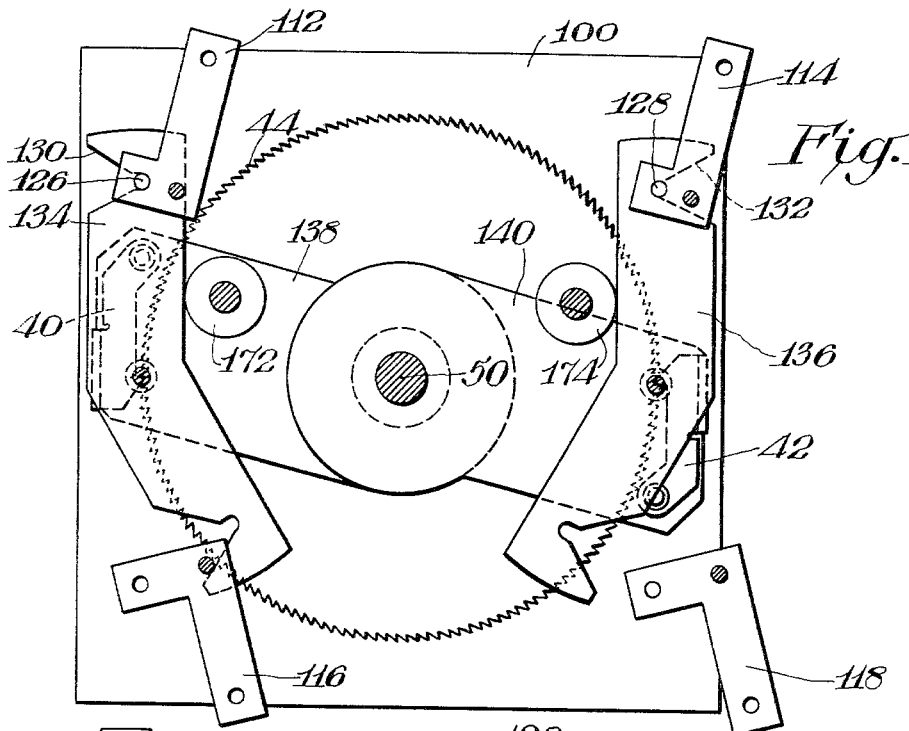
FIG. 15 is a view similar to FIG. 13 in another phase of operation.

In FIG. 1 is shown a presettable control device 10 connected to a fluid dispenser 11 having dispensing elements 12 including a hose and nozzle 14, and a computer 16 of the type disclosed in U.S. Letters Patent 2,111,996. Computer 16 includes a cost or money output shaft 18 and a quantity or gallon output shaft 20. Control device 10 includes a dual alternative input counter 22 which is selectively connected by shift 32 to money output shaft 18 through transmission section 24 (which incorporates linkage 26) or to gallon output shaft 20 through transmission section 28 (which incorporates linkage 30).

As shown in FIG. 1, when knob 34 of counter 22 is pushed in, pins 36 and 38 disengage pawls 40 and 42 from ratchet 44. Knob 34 is then rotated to set pointer 46 at the selected quantity of money or gallons on scale 48, which is indexed in terms of both cost and quantity. Since ratchet 44 is also mounted on preset shaft 50, the ratchet is set the same distance ahead of its zero position as pointer 46. Handle 52 is then moved to actuate shift 32 which is connected to pawls 40 and 42 into engagement with either money transmission linkage 26 or with gallon transmission linkage 30 to drive ratchet 44 back to its zero condition in accordance with either the cost or quantity of fluid dispensed. When ratchet 44 is in its zero condition, detecting means 54 close valves 56 and 58 to terminate the delivery of gasoline.

When the customer specifies the amount of gasoline he wants, the attendant first turns reset handle 60 to zeroize the computer. As shown in FIGS. 16 and 17, rotation of operating handle causes operating shaft 62 to rotate through linkage 64. Hub or inner ring 66 which is mounted on operating shaft 62 rotates in the direction shown in FIG. 17. Spring 68 reacting between inner ring 66 and outer ring or gear 70 maintains stop member 72 on outer ring 70 in engagement with stop pin 74 to couple inner ring 66 and outer ring or gear 70. The operating mechanism also includes pivot arms 80 and 82 which are rotated by gears 76 and 78 respectively. As pivot arms 80 and 82 rotate in the direction indicated in FIG. 17, dogs 84 and 86 engage one-way clutches 88 and 90 respectively to rotate the one-way clutches. Outer ring or gear 70 is held at its zero position when stop member 92 engages stop pin 94 on computer housing 16.

After computer 16 is turned on the attendant moves shift handle 52 to bring shifting mechanism 32 into engagement with money transmission linkage 26 or gallons transmission linkage 30, as later described in detail. The attendant pushes control knob 34 to move preset shaft 50 axially inward. As shown in FIG. 4, camming surface 96 moves pins 36 and 38 upward to disengage pawls 40 and 42 from ratchet 44 so that ratchet 44 can be rotated from its zero or original position. Disengaging pins 36 and 38 slide in apertured projections 98 on front plate 100. The attendant then rotates knob 34 and pointer 46 which is also mounted on preset shaft 50 so that pointer 46 is at the value specified by the customer. Guard 102 shields the pointer. Since ratchet 44 is also on preset shaft 50, the ratchet rotates the same amount as pointer 46.

Ratchet 44 has a zero and advanced positions and its number of teeth correspond to the money value and to the gallon value on visual indicating dial or index element 48. As shown in FIG. 6, indicating dial 48 advantageously has both a money scale and a gallon scale. Although both scales are independent of each other, it is possible to place them on the same indicating dial since shifting mechanism 32, later described in detail, causes ratchet 44 to be rotated as a function of either the money or the gallons. When pointer 46 is set at the desired value, knob 34 is released and pawls 40 and 42 again engage ratchet 44.

As gasoline is dispensed from hose and nozzle means 14, computer 16 rotates money output shaft 18 and gallon output shaft 20 as a function of the cost and quantity, respectively, of the dispensed gasoline. As shown in FIGS. 7 and 8, one-way clutch 88 on money output shaft 18 rotates crank pin 104 in slot 106 of link or tie bar 108 which is attached to tie bar 110. The rotation of crank pin 104 in slot 106 thus drives the tie bars back and forth. Bell cranks 112 and 114 are connected to tie bar 110 and thereby oscillate in response to the movement of the tie bars. Correspondingly, gallon bell cranks 116 and 118 pivot in response to the oscillation of tie bars 120 and 122 caused by crank pin 124 on gallon one-way clutch 90.

Figure 13:
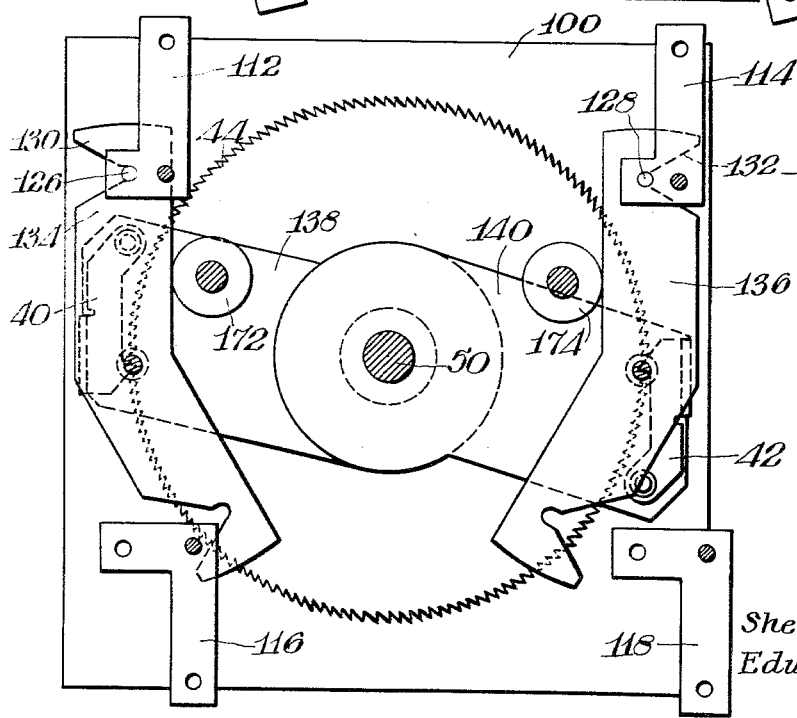
FIG. 13 is a cross-sectional view taken through FIG. 4 along the line 13—13.

As shown in FIGS. 13–14, pins 126 and 128 on bell cranks 112 and 114 respectively are engaged in notches 130 and 132 of shifting links 134 and 136 respectively. The movement of the bell crank causes the shifting links to oscillate. As shown in FIG. 15, this motion is transmitted to pivot arms 138 and 140 which are mounted on preset shaft 50 and are connected to shifting links 134 and 136 respectively. Pawls 40 and 42 are connected to pivot arms 138 and 140 respectively and thereby rotate ratchet 44 back to its original or zero position. Pawls 40 and 42 are so positioned with respect to the ratchet teeth, as shown in FIG. 13, that when pawl 40 moves ratchet 44, pawl 42 rides over the ratchet teeth and when pawl 42 moves ratchet 44, pawl 40 rides over the ratchet teeth.

As shown in FIGS. 7 and 8, detectng means 54 includes cams 142 and 144 which are mounted on preset shaft 50 and thus rotate with ratchet 44. Cam 142 has a groove 146 disposed to actuate microswitch 148 at a predetermined amount before ratchet 44 is returned to its original position, for example, the ten-cent position of ratchet 44 and pointer 46. Microswitch 148 is operatively connected to close valve 56 to throttle the delivery of gasoline during the last ten-cents' worth of gasoline. When ratchet 44 returns to its original or zero position, groove 150 in cam 144 actuates microswitch 152 to close valve 58 to completely stop the delivery of gasoline.

When the customer specifies the amount he wants in gallons, the attendant moves shift handle 52, shown in FIGS. 5 and 6, to the gallon position. Downward movement of handle 52 causes link 154 to pull bar 156 downward. As shown in FIG. 10, pivoted money-to-gallon shift 158 is connected to bar 156 and has a slot 160 which engages pin 162 on shifting yoke 164. When shift 158 is pivoted downward, it thus also moves yoke 164 downward. As shown in FIGS. 10–11, yoke 164 slides on back plate 166 by means of roller 168 in back plate slot 170 and rollers 172 and 174 which respectively ride in slots 176 and 178. Rollers 172 and 174 also respectively rest against shifting links 134 and 136. As shown in FIG. 10, when yoke 164 is in the money position, rollers 172 and 174 maintain shifting links 134 and 136 in engagement with money bell cranks 112 and 114. Since the shifting links are not engaged with gallon bell cranks 116 and 118, the movement of these bell cranks has no effect on ratchet 44. When yoke 164 is shifted downward to the gallon engaging position shown in FIG. 12, rollers 172 and 174 move shifting links 134 and 136 into respective engagement with pins 180 and 182 on gallon bell cranks 116 and 118 to thereby connect pawls 40 and 42 with linkage 30 of transmission 28 from gallon shaft 20. As shown in FIG. 9, tie bars 120 and 122 are offset in their central portion to permit shifting yoke 164 to extend below the tie bars.

When the customer does not specify any amount of gasoline but tells the attendant to "fill it up," the attendant pushes knob 34 and shaft 50 to disengage pawls 40 and 42, rotates ratchet 44 to an advanced position and then leaves the shaft in its inward position and the ratchet in its advanced position so that the disengaged pawls do not transmit the movement of the money or gallon output shaft to drive the ratchet back to its zero condition.

What is claimed is:

1. A preset dispensing control for a fluid dispenser incorporating dispensing means and computer means having a cost output shaft and a quantity output shaft, said control comprising a dual alternative input counter, said counter being indexed in terms of both cost and quantity, a moving element in said counter having a zero and advanced positions, manually operable means for setting said moving element amounts ahead of said zero position, drive means connected to said moving element, transmission means connecting said drive means to said cost and quantity shafts for driving said moving element back to said zero position in accordance with the amount of either dispensed, shifting means connected to said transmission means for causing said moving element to be driven by either of said shafts, stop means connected to said dispenser for terminating its operation, detecting means connected to said stop means and to said moving element for terminating the dispensing operation when said moving element is driven back to said zero position after the preselected amount is dispensed, said moving element being a ratchet, said drive means comprising pawl means engaging said ratchet and connected to said shifting means, said manually operable means including pawl disengaging means for freeing said ratchet to permit it to be set ahead said preselected amount, said pawl disengaging means comprising disengaging pins disposed adjacent said pawl means, and a camming surface on a preset shaft disposed to move said disengaging pins against said pawl means when said preset shaft is axially moved to disengage said pawl means from said ratchet whereby said ratchet is permitted to be set ahead said preselected amount.

2. A preset dispensing control for a fluid dispenser incorporating dispensing means and computer means having a cost output shaft and a quantity output shaft, said control comprising a dual alternative input counter, said counter being indexed in terms of both cost and quantity, a moving element in said counter having a zero and advanced positions, manually operable means for setting said moving element amounts ahead of said zero position, drive means connected to said moving element, transmission means connecting said drive means to said cost and quantity shafts for driving said moving element back to said zero position in accordance with the amount of either dispensed, shifting means connected to said transmission means for causing said moving element to be driven by either of said shafts, stop means connected to said dispenser for terminating its operation, detecting means connected to said stop means and to said moving element for terminating the dispensing operation when said moving element is driven back to said zero position after the preselected amount is dispensed, said moving element being a ratchet, said drive means comprising pawl means engaging said ratchet and connected to said shifting means, said manually operable means including pawl disengaging means for freeing said ratchet to permit it to be set ahead said preselected amount, said manually operable means including a preset shaft, a visual indicating element being mounted on said present shaft to indicate the amount of its rotation in terms of the indexed cost and quantity, said ratchet being mounted on said preset shaft, said pawl disengaging means comprising disengaging pins disposed adjacent said pawl means, and a camming surface on said preset shaft disposed to move said disengaging pins against said pawl means when said preset shaft is axially moved to disengage said pawl means form said ratchet whereby said ratchet is permitted to be set ahead said preselected amount.

3. A control as set forth in claim 1 wherein said detecting means comprises cam means mounted upon said preset shaft and switch means operatively connected to said stop means and disposed adjacent said cam means.

4. A control as set forth in claim 1 wherein said transmission means comprises a cost transmission section connected to said cost output shaft and a quantity transmission section connected to said quantity output shaft, said shifting means including shifting link means connected to said drive means for said moving element and disposed adjacent said cost transmission section and said quantity transmission section, and means for selectively moving said shifting means into engagement one at a time with said cost transmission section and said quantity transmission section.

5. A control as set forth in claim 4 wherein said means for selectively moving said shifting link means includes a shifting yoke abutting against said shifting link means and disposed and arranged to move it into engagement with said cost transmission section or said quantity transmission section.

6. A preset dispensing control for a fluid dispenser incorporating dispensing means and computer means having a cost output shaft and a quantity output shaft, said control comprising a dual alternative input counter, said counter being indexed in terms of both cost and quantity, a moving element in said counter having a zero and advanced positions, manually operable means for setting said moving element amounts ahead of said zero position, drive means connected to said moving element, transmission means connecting said drive means to said cost and quantity shafts for driving said moving element back to said zero position in accordance with the amount of either dispensed, shifting means connected to said transmission means for causing said moving element to be driven by either of said shafts, stop means connected to said dispenser for terminating its operation, detecting means connected to said stop means and to said moving element for terminating the dispensing operation when said moving element is driven back to said zero position after the preselected amount is dispensed, said transmission means comprises a one-way clutch on each of said cost output shaft and said quantity output shaft, a crank pin on each of said one-way clutches, and a transmission linkage engaged with each of said crank pins.

7. A control as set forth in claim 6 wherein each of said transmission linkages comprises bell crank means disposed adjacent said shfiting means, a tie bar connected to each of said bell crank means, each of said tie bars having a slot, and each of said crank pins being engaged in said slot in each of said tie bars.

8. A control as set forth in claim 7 wherein said moving element is a ratchet, said driving means comprising pawl means normally contacting said ratchet, said shifting means comprising shifting link means connected to said pawl means and disposed adjacent each of said bell crank means, and means for selectively moving said shifting link means into engagement one at a time with each of said bell crank means.

9. A control as set forth in claim 8 wherein said means for selectively moving said shifting link means includes a shifting yoke abutting against said shifting link means and disposed and arranged to move it into engagement one at a time with each of said bell crank means.

10. A preset dispensing control for a fluid dispenser incorporating dispensing means and computer means having a cost output shaft and a quantity output shaft, said control comprising a dual alternative input counter, said counter being indexed in terms of both cost and quantity, a moving element in said counter having a zero and advanced position manually operable means for setting said moving element amounts ahead of said zero position, drive means connected to said moving element, transmission means connecting said drive means to said cost and quantity shafts for driving said moving element back to said zero position in accordance with the amount of either dispensed, shifting means connected to said transmission means for causing said moving element to be driven by either of said shafts, stop means connected to said dispenser for terminating its operation, detecting means connected to said stop means and to said moving element for terminating the dispensing operation when said moving element is driven back to said zero position after the preselected amount is dispensed, said transmission means comprising a cost transmission section connected to said cost output shaft and a quantity transmission section connected to said quantity output shaft, said shifting means including shifting link means connected to said drive means for said moving element and disposed adjacent said cost transmission section and said quantity transmission section, means for selectively moving said shifting means into engagement one at a time with said cost transmission section and said quantity transmission section, and said means for selectively moving said shifting link means including a shifting yoke abutting against said shifting link means and disposed and arranged to move it into engagement with said cost transmission section or said quantity transmission section.

References Cited by the Examiner
UNITED STATES PATENTS 2,358,712   9/1944   Hinds _____ 222—16

LOUIS J. DEMBO, *Primary Examiner.*

EVERETT W. KIRBY, *Examiner.*